(12) United States Patent
Stoller et al.

(10) Patent No.: US 6,800,396 B1
(45) Date of Patent: Oct. 5, 2004

(54) NICKEL HYDROXIDE COATED WITH COBALTOUS HYDROXIDE

(75) Inventors: Viktor Stoller, Bad Harzburg (DE); Michael Erb, Salzgitter (DE); Armin Olbrich, Seesen (DE); Juliane Meese-Marktscheffel, Goslar (DE)

(73) Assignee: H. C. Starck GmbH, Goslar (DE)

( * ) Notice: Subject to any disclaimer, the term of this patent is extended or adjusted under 35 U.S.C. 154(b) by 0 days.

(21) Appl. No.: 09/914,984
(22) PCT Filed: Feb. 28, 2000
(86) PCT No.: PCT/EP00/01667

§ 371 (c)(1),
(2), (4) Date: Dec. 18, 2001

(87) PCT Pub. No.: WO00/52988

PCT Pub. Date: Sep. 14, 2000

(30) Foreign Application Priority Data

Mar. 10, 1999 (DE) .......................... 199 10 461

(51) Int. Cl.[7] .............................................. H01M 4/32
(52) U.S. Cl. ...................................... 429/223; 423/142
(58) Field of Search .......................... 429/223; 423/142, 423/419.1

(56) References Cited

U.S. PATENT DOCUMENTS

| | | | |
|---|---|---|---|
| 3,066,178 A | 11/1962 | Winkler | 136/24 |
| 5,573,633 A | 11/1996 | Gambino et al. | 156/638 |
| 5,707,761 A | 1/1998 | Hayashi et al. | 429/206 |
| 5,795,826 A | 8/1998 | Gambino et al. | 438/692 |
| 6,007,946 A | * 12/1999 | Yano | 429/223 |

FOREIGN PATENT DOCUMENTS

| | | |
|---|---|---|
| DE | 19 619 235 | 11/1996 |
| EP | 0 853 346 | 7/1998 |
| GB | 2060241 | 4/1981 |
| JP | 2-589123 | 3/1997 |
| JP | 10-021901 | * 1/1998 ............ H01M/4/26 |

OTHER PUBLICATIONS

The 3rd Symposium for Sectional New–Battery Study Group, Sectional New–Battery Study Group in Battery Technology Committee of the Electrochemical Society, Dec. 11, 1986, Development of High–Capacity Nickel–Cadmium Battery Using Sintered Metal–Fiber as Substrate by Masahiko Oshitani pp. 1–22.
**Patent Abstracts of Japan, vol. 1997, No. 08, Aug. 29, 1997 –& JP 09 102307 A (Toshiba Battery Co Ltd), Apr. 15, 1997 Zusammenfassung.
**Database Chemabs 'Online! Chemical Abstracts Service, Columbus, Ohio, US; Hiruma, Masayoshi et al; "Electrode, alkaline secondary battery with high storage stability, and manufacture of the alkaline secondary battery" retrieved from STN Database accession No. 131:33893 CA XP002145314 Zusammenfassung –& JP 11 162469 A (Toshiba Battery Co., Ltd., Japan) Jun. 18, 1999.
**Database Chemabs 'Online! Chemical Abstracts Service, Columbus, Ohio, US Watada, Shoji et al: "Nickel hydroxide cathode active mass having cobalt compound coatings for alkaline storage batteries, their preparation, and same battery cathodes" retrieved from STN Database accession No. 128:156625 CA XP002145313 abstract –& JP 10 021901 A (Yuasa Battery Co., Ltd., Japan; Tanaka Kagaku Kenkyusho K. K.) Jan. 23, 1998.

* cited by examiner

*Primary Examiner*—Mark Ruthkosky
(74) *Attorney, Agent, or Firm*—Joseph C. Gil; Diderico van Eyl

(57) ABSTRACT

A nickel hydroxide for rechargeable batteries which is provided with a cobalt hydroxide coating which is stable to oxidation is described. The stability to oxidation is achieved by covering the surface of the cobalt hydroxide layer with anions of weak inorganic oxygen acids.

8 Claims, 1 Drawing Sheet

NICKEL HYDROXIDE COATED WITH COBALTOUS HYDROXIDE

Figure 1:
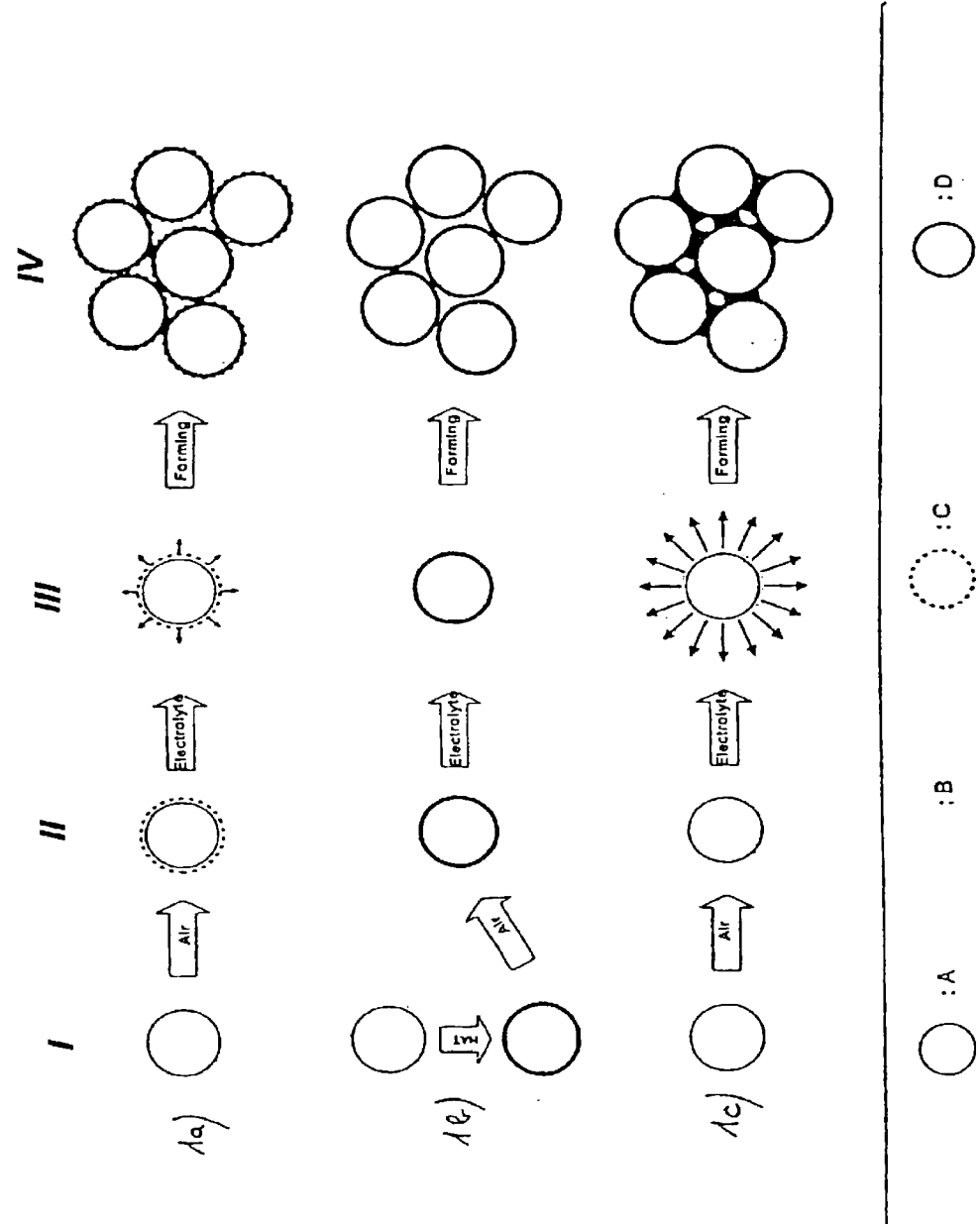

This application is the National Stage Application of PCT/EP00/01667, which claims a priority from German Application 199 10 461.1, filed Mar. 10, 1999.

BACKGROUND OF THE INVENTION

The present invention relates to a nickel hydroxide which is stable to oxidation and coated with cobalt hydroxide, and to a process for the preparation thereof, in particular for use as a positive active mass in rechargeable alkaline batteries.

Although nickel hydroxide is outstandingly suitable for storage of electrical energy because of its storage capacity of 1 to (with a corresponding defect structure) a theoretical maximum of 1.67 electrons per Ni, it has a number of undesirable properties, such as low electrical conductivity, low cycle stability, low charging capacity at high temperatures and the tendency to swell because of the spontaneous formation of different crystal phases with different lattice spacings.

In a very early stage of the development of nickel hydroxide batteries it was already recognized that the properties of the batteries can be improved by using nickel hydroxide coated with cobalt(II) hydroxide (see U.S. Pat. No. 3,066,178). Nevertheless, the industrial use of nickel hydroxide coated with cobalt hydroxide has not since become accepted because of the sensitivity of cobalt(II) hydroxide to oxidation. Rather, the route taken in the production of the battery is the use of non-coated nickel hydroxide with the addition of Co metal powder or cobalt compounds, such as Co(II)O or $Co(OH)_2$, where a cobalt hydroxide coating crosslinked between the nickel hydroxide particles forms on the nickel hydroxide via intermediate cobalt(II) hydroxo complexes during more prolonged standing (typically 1 to 3 days), the cobalt compound dissolving in the electrolyte, this coating then being converted into the actually conductive but electrochemically inactive cobalt oxyhydroxide network during the first electrical charging of the battery. A comprehensive description of the mechanisms which are important here is to be found in the paper by Oshitani at the 3rd Symposium for Sectional New-Battery Study Group in Battery Technology Committee of the Electrochemical Society, Dec. 11, 1986, entitled "Development of high-capacity nickel-cadmium battery using sintered metal fiber as substrate". The models described there in respect of cobalt compounds also apply to other substrates and cathode materials.

When nickel hydroxides which are coated according to the prior art with a cobalt(II) hydroxide layer which is not stable to oxidation by atmospheric oxygen are used, in the course from production via storage to the actual use in the battery a passivating cobalt(II)-containing layer forms on the surface of the coated nickel hydroxide particles, this not only impeding the solubility of the cobalt species to give the cobalt hydroxo complexes to be formed intermediately (reduction in the contact surface due to inadequate fusion), but additionally having a poor electrical conductivity. This then necessarily means that large parts of the active nickel mass are not accessible electrically and as more or less dead material can no longer contribute towards the capacity of the battery.

It has also already been proposed (Japanese Patent 25 89 123) to generate the conductive electrochemically inactive cobalt oxyhydroxide layer by precipitating a cobalt hydroxide layer on to the nickel hydroxide particles and subsequently oxidizing the layer in alkaline solution by means of oxygen at a higher temperature. Such nickel hydroxide coated with cobalt oxyhydroxide is indeed stable to oxidation; however, a disadvantage is the fact that although the individual particles in its outer shell have a good conductive layer, the formation of a three-dimensional conductive network between the individual particles (increasing the contact surface by "fusion") can be achieved only by further addition of cobalt compounds which are adequately soluble in the alkaline electrolyte. If this addition is omitted, only loose contact points exist between the individual particles and the total resistance of the electrode is increased because of the transition resistance which occurs between the individual particles.

On the other hand, a cobalt(II) hydroxide coating remains soluble in the alkaline electrolyte to the extent that crosslinking takes place by dynamic dissolving and addition processes, so that conductivity bridges are generated between the particles after conversion to cobalt oxyhydroxide during the initialization charging cycle. The coated individual particles are "fused" in an electrically conductive manner at the contact points of the $Co(OH)_2$ or CoOOH coating. A condition of this, however, is the provision of a nickel hydroxide with a cobalt(II) hydroxide coating which is stable to oxidation.

Accordingly, it has also already been proposed to treat cobalt(II) hydroxide (as a conductive additive to nickel hydroxide) or nickel hydroxide coated with cobalt(II) hydroxide with antioxidants, such as D-glucose (EP-A 744 781) or higher carboxylic acids, their esters, aldehydes, phenols or vitamins (EP-A 771 041). A disadvantage here is that the protection against oxidation is achieved only indirectly, since the antioxidants only become active with respect to the oxidized cobalt(II) form in the sense of a reduction. A further disadvantage is that the antioxidant is consumed in the course of time, that is to say the oxidation protection is limited with respect to time. There is furthermore the risk that undesirable degradation products of the antioxidant are entrained into the battery.

DESCRIPTION

It has now been found that the cobalt hydroxide layer can be formed in a form which is stable to oxidation if the coated nickel hydroxide is treated with weak inorganic oxygen acids or alkali metal salts thereof. In this procedure, the surface of the coated particles is covered with anions of the acids. Suitable anions are one or more anions from the group consisting of aluminate, borate, carbonate, chromate, manganate, molybdate, niobate, phosphate, silicate, tantalate, titanate, vanadate and tungstate, or oxalates.

Borate, phosphate, carbonate and/or silicate are preferred. Carbonate is particularly preferred.

"Stable to oxidization" in the context of the invention means that the degree of oxidation of the cobalt hydroxide does not change during storage in air and at ambient temperature (up to 40° C.). Li, Na, K and/or pseudo-alkali metals, such as ammonium, are suitable as the alkali metal. The treatment is preferably carried out in an aqueous solution of the alkali metal salts, in particular of the sodium salt.

A less than monomolecular covering of the $Co(OH)_2$ surface is sufficient to render the nickel hydroxide provided with the $Co(OH)_2$ coating stable to oxidation.

It has been found that such a surface covering does not impair the solubility of the cobalt(II) hydroxide coating in the alkaline electrolyte of the battery, so that the effect of the formation of a three-dimensional network of high conductivity, called "fusion" above, can also take place unimpeded without the addition of a further conductive additive. As a result, it is possible to keep the total amount of cobalt employed to a minimum.

The invention provides a nickel hydroxide which is provided with a cobalt hydroxide layer which is stable to oxidation and the pastel green colour of which is retained during storage in the atmosphere for a period of at least 4 weeks; preferably for a period of 6 months.

The invention also provides a nickel hydroxide provided with a cobalt hydroxide layer which is stable to oxidation, the content of cobalt in the 3-valent oxidation level increasing by less than 0.5%, based on the total content of cobalt, even after storage in air (ambient temperature 10 to 35° C.) for at least 6 months.

The oxidation level of the cobalt here is preferably determined by iodometric titration in a manner known per se.

The invention furthermore provides a nickel hydroxide which is provided with a cobalt hydroxide coating and has on its surface an at most monomolecular layer of anions of weak inorganic oxygen acids. The concentration of the anion of the weak acid is preferably 5 to 20 $\mu mol/m^2$ of surface coated with cobalt hydroxide. A surface covering of 10 to 18 $\mu mol/m^2$ is especially preferred.

The superficial anion concentration is preferably 10 to 50 mmol per mol of cobalt(II) hydroxide, based on the amount of the cobalt hydroxide coating.

The nickel hydroxide powder according to the invention is preferably free from antioxidants or organic degradation products thereof.

FIG. 1 explains the invention by comparison with the prior art.

The circles A represent diagrams of a nickel hydroxide particle, the grey structure B represents a $Co(OH)_2$ coating, the broken circle C represents a partial oxidation of the $Co(OH)_2$ coating and the dark structure D represents a CoOOH coating.

FIG. 1a) explains the prior art, according to which a nickel hydroxide (I) coated with $Co(OH)_2$ which is not stable to oxidation is partly oxidized (II) on the surface by contact with ambient air. As a result, the hydroxo complex formation in the electrolyte (III) is impeded. Even after forming, only a partial conductivity network can thereby form (IV).

FIG. 1b) explains the generation of a CoOOH coating by conversion of the $Co(OH)_2$ coating by alkaline oxidation at elevated temperature (I). The conductivity of the active mass in the battery is determined by loose point contacts (IV).

FIG. 1c) shows the nickel hydroxide (I, II) which is provided according to the invention with a $Co(OH)_2$ coating which is stable to oxidation, and which remains soluble (III) in the electrolyte via hydroxo complexes and therefore forms a Co(OOH) network on forming (first charging and discharging cycles).

The nickel hydroxide to be employed according to the invention can be prepared in any desired manner.

Known processes for the preparation of nickel hydroxide are chemical precipitation from aqueous nickel salt solutions by means of alkali metal hydroxide solutions, electrolytic dissolving of nickel anodes in an aqueous salt-containing electrolyte, oxidation of nickel metal powder under pressure, dissolving of nickel powder as a complex in an ammonia solution and subsequent precipitation by distillation, and by oxidizing hydrolysis and subsequent reduction of alkali metal nickelates. Processes of chemical precipitation or of electrolytic dissolving of nickel anodes are preferred. A spherical nickel hydroxide which is prepared by one of the known processes of the prior art is preferably employed.

The nickel hydroxide base particles prepared by one of the known processes are first coated with cobalt(II) hydroxide in a first step in aqueous suspension with the addition of cobalt(II) salts and alkali metal hydroxide solution and/or ammonia under suitable conditions. Preferred conditions for achieving a uniform cobalt(II) hydroxide coating are: continuous, semi-batch or batch process procedure, residence time 0.2 to 12 h; temperature 0 to 120° C., preferably 30 to 60° C., and particularly preferably 30 to 40° C.; pressure 0.1 to 2.5 bar, preferably 0.5 to 1.2 bar; pH at 25° C. 8.5 to 13, preferably 9.5 to 11.5, and particularly preferably 10.2 to 10.8; solids concentration 10 to 700 g/l, preferably 100 to 400 g/l; $NH_3$ content 0 to 15 g/l, preferably 0 to 10 g/l, particularly preferably 2 to 5 g/l; alkali metal/cobalt ratio 75 to 150%, preferably 80 to 95% of the stoichiometry; optionally filtration, washing with water and/or dilute alkali metal hydroxide solution, preferably sodium hydroxide solution with a pH of 11 to 12. The coating with cobalt(II) hydroxide can also be carried out without an inert gas or the addition of antioxidants.

To stabilize the cobalt(II) hydroxide coating by rendering the surface inert, the original precipitation suspension of the coating process or, preferably, the nickel hydroxide which has been coated with cobalt(II) hydroxide and has already been separated off from the mother liquor and resuspended in water is then treated in a second step with the weak acids listed above or aqueous alkali metal salts or alkali metal hydrogen salts thereof. The stabilizing treatment can also be carried out directly after filtration of the mother liquor of the original precipitation suspension of the coating process, by treatment of the unwashed or washed filter cake. The temperature range of the stabilizing treatment is 0 to 100° C., preferably 20 to 60° C., and particularly preferably 40 to 50° C. The duration of the treatment can be 0.2 to 12 hours.

It has proved to be particularly advantageous to carry out the stabilizing treatment by carbonation of the surface of the nickel hydroxide coated with cobalt(II) hydroxide. The carbonation here is preferably carried out by addition of alkali metal carbonate and/or alkali metal bicarbonate solutions at concentrations from 0.01 mol/l up to the solubility maximum, preferably 0.03 to 1 mol/l, the amount of alkali metal carbonate and/or alkali metal bicarbonate solution being 0.1 to 10 times the weight, based on the solids content of the suspension which comprises the nickel hydroxide coated with cobalt(II) hydroxide. In the context of the invention, the carbonation then also proceeds if the carbonation takes place by addition of carbon dioxide, e.g. introduction as a gas.

A particularly preferred embodiment of the invention comprises treating the still moist filter cake from the cobalt hydroxide coating or the subsequent washing in carbon dioxide or carbon dioxide-containing air under $CO_2$ partial pressures of 0.01 to 2 bar, preferably 0.01 to 1 bar. The treatment can be carried out simultaneously with the drying of the powders, for example in continuously operated spray dryers or spin flash dryers.

The nickel hydroxide coated with a stabilized cobalt(II) hydroxide layer after the stabilizing treatment has been concluded can optionally also additionally be washed before the final drying step. The drying itself does not have to be carried out with exclusion of air (vacuum or inert gas), but drying can be carried out in air to save costs. All the conventional types of dryer can be used as drying units.

Although pulverulent nickel hydroxide is preferred according to the invention, the invention is not limited to pulverulent nickel hydroxide. According to the invention, it is possible in an analogous manner first to precipitate nickel hydroxide on to a substrate, preferably a nickel gauze, nickel nonwoven or a nickel foil, subsequently to coat this with cobalt hydroxide and then to immerse the coated substrate into the treatment solution.

Preferred base nickel hydroxides have average particle sizes (D50 value, measured by the Mastersizer method) of 0.5 to 500 $\mu$m, particularly preferably 2 to 30 $\mu$m. The specific surface area can advantageously be 2 to 70 $m^2/g$, measured by the BET method.

The base nickel hydroxide can furthermore comprise one or more doping elements known per se from the group consisting of magnesium, calcium, strontium, scandium, yttrium, lanthanum, lanthanoids, titanium, zirconium, chromium, molybdenum, tungsten, manganese, iron, cobalt, copper, cadmium, zinc, boron, aluminium, gallium, indium, silicon, phosphorus, arsenic, antimony and bismuth, in amounts of 0.2 to 25 wt. % in total. Preferred nickel hydroxides are doped with 0.5 to 5 wt. % zinc and 0.5 to 5 wt. % cobalt in a total amount of 3 to 8 wt. %.

The cobalt hydroxide coating can also comprise doping elements from the abovementioned group in a manner known per se.

The invention is further described in the following illustrative examples in which all parts and percentages are by weight unless otherwise indicated.

The invention is illustrated in more detail by the following example:

EXAMPLE 348.5 g/h of a $CoCl_2$ solution (7.0% Co), 297.5 g/h of a 10% NaOH solution, 180 ml/h of a 100 g/l $NH_3$ solution and 3,000 ml/h of an $Ni(OH)_2$ suspension (150 g/l of spherical $Ni(OH)_2$ doped with Co and Zn, 80 g/l NaCl, 3.5 g/l $Na_2SO_4$) are continuously metered in parallel into a 17 liter stirred reactor temperature-controlled at 37° C. A pH (25° C.) of 10.5 and an $NH_3$ content (Kjeldahl) of approx. 3.5 g/l are established here in the equilibrium state. After a first runnings time of 24 hours, the outflow from the reactor (approx. 3,750 ml/h) is collected at 24 h intervals for a further 72 hours, filtered batchwise and washed with in each case 23 kg of temperature-controlled 0.2 g/l NaOH solution (45° C.). The residue on the filter is then treated with 46 kg 1.0 mol/l $Na_2CO_3$ solution (45° C.) and finally washed with 46 kg completely demineralized water (45° C.). Drying is carried out at 50° C. in vacuo. The product yield is 11.7 kg per 24 h batch.

Table 1 shows analytical values of the non-coated base nickel hydroxide. Table 2 shows analytical values of the nickel hydroxide coated with cobalt hydroxide with oxidation-stabilizing treatment immediately after preparation and after storage in air for 6 months.

TABLE 1

| $Ni(OH)_2$ base material, non-coated | | | | | | | |
| --- | --- | --- | --- | --- | --- | --- | --- |
| Ni (%) | $Co_{tot.}$ (%) | Co(III) (%) | Zn (%) | Cl (ppm) | Na (ppm) | $SO_4$ (ppm) | C (ppm) |
| 57.17 | 1.44 | 0.5 | 3.65 | 360 | 31 | 80 | 1,100 |

TABLE 1-continued

| $Ni(OH)_2$ base material, non-coated | | | |
| --- | --- | --- | --- |
| TD ($g/cm^3$) | MS $D_{50}(\mu m)$ | CS (A) | BET ($m^2/g$) |
| 2.0 | 4.5 | 70 | 19.84 |

TABLE 2

| $Ni(OH)_2$ base material according to the invention, coated with $Co(OH)_2$ and $CO_3$ | | | | | | | |
| --- | --- | --- | --- | --- | --- | --- | --- |
| Ni (%) | $Co_{tot.}$ (%) | Co(III) (%) | Zn (%) | Cl (ppm) | Na (ppm) | $SO_4$ (ppm) | C (ppm) |
| 52.92 | 6.44 | 0.7 | 3.36 | 420 | 35 | 140 | 1,400 |

| TD ($g/cm^3$) | MS $D_{50}(\mu m)$ | CS (A) | BET ($m^2/g$) | Co(III) after storage in air for 6 months (%) |
| --- | --- | --- | --- | --- |
| 2.0 | 5.11 | 70 | 17.42 | 0.7 |

TD = tap density;
MS = particle size determined by the Mastersizer method;
CS = crystallite size determined by X-ray analysis;
BET = specific surface area measured by the BET method, % values = wt. %.

The nickel hydroxide material coated according to the invention and prepared according to the example is measured, after storage in air for 6 months, in the half cell test without any addition of a conductive additive in the electrode production and, from the 3rd (charging and discharging) cycle, reaches 99% of the Ni utilization, based on the one-electron step.

A conventional three-electrode arrangement which comprises an Hg/HgO reference electrode, a nickel plate counter-electrode and the working electrode comprising the nickel hydroxide active mass is chosen here. The electrochemical measurement takes place galvanostatically, i.e. a constant charging and discharging current is set between the working electrode and counter-electrode. The potential of the working electrode against the potential of the reference electrode is measured. The cyclic operation is effected by 15 hours of charging with $I_{10}$ ($I_{10}$ designates the charging current which delivers 100% of the theoretical charging capacity in 10 hours) and discharging with $I_{10}$ to 0 V vs. Hg/HgO. An aqueous potassium hydroxide solution is used as the electrolyte. To prepare the working electrode, the nickel hydroxide material according to the invention is prepared as a foam electrode and then measured.

Although the present invention has been described in detail with reference to certain preferred versions thereof, other variations are possible. Therefore, the spirit and scope of the appended claims should not be limited to the description of the versions contained therein.

What is claimed is:

1. A coated nickel hydroxide having a cobalt hydroxide coating, wherein the nickel hydroxide is stable to oxidation, and wherein the coating has 1 to 200 mmol of one or more anions of weak inorganic oxygen acids per mol of cobalt(II) hydroxide on a surface of the coating, and wherein the anions form, at most, a monomolecular layer.

2. The nickel hydroxide according to claim 1, wherein the anion is $CO_3$.

3. The nickel hydroxide according to claim 1, wherein the nickel hydroxide is in the form of powder and wherein the nickel hydroxide has an average particle size (D50 value, measured by the Mastersizer method) of 0.6 to 500 μm.

4. The nickel hydroxide according to claim 1, wherein the nickel hydroxide is a coating on a substrate.

5. The nickel hydroxide according to claim 1, wherein the nickel hydroxide comprises an amount of 0.2 to 25 wt. % in total of a doping element selected from the group consisting of Mg, Ca, Sr, Sc, Y, La, lanthanoids, Ti, Zr, Cr, Mo, W, Mn, Fe, Co, Cu, Zn, Cd, B, Al, Ga, In, Si, P, As, Sb and Bi, and combinations thereof.

6. The nickel hydroxide according to claim 1, wherein the nickel hydroxide has water molecules at interstitial sites in an amount of up to 10 wt. %.

7. The coated nickel hydroxide of claim 1, wherein a doped or non-doped nickel hydroxide is coated with stabilized cobalt(II) hydroxide.

8. An electrode material in a secondary battery comprising the nickel hydroxide of claim 7.

* * * * *